Oct. 6, 1953
W. R. LEWIS
2,654,860
CONSISTENCY MEASURING APPARATUS
RESPONSIVE TO MOTOR CURRENT
Filed Nov. 23, 1949
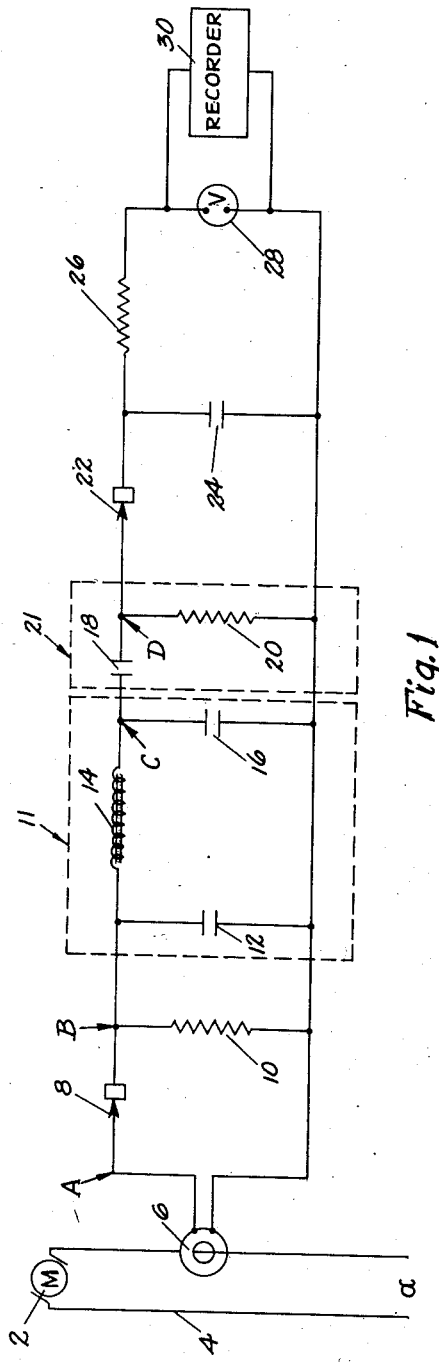
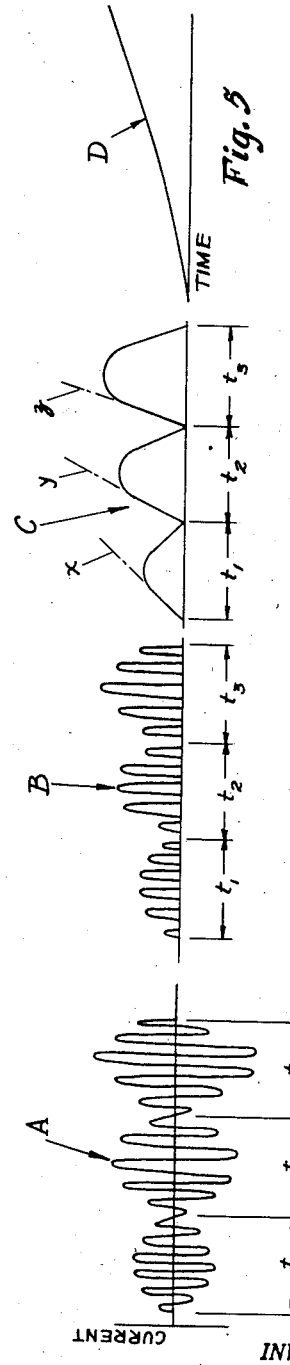
INVENTOR.
William R. Lewis
BY
Bailey, Stephens & Huettig
ATTORNEYS Patented Oct. 6, 1953

2,654,860

UNITED STATES PATENT OFFICE 2,654,860

CONSISTENCY MEASURING APPARATUS RESPONSIVE TO MOTOR CURRENT

William R. Lewis, Kansas City, Mo., assignor to C. J. Patterson Company, a corporation of Missouri Application November 23, 1949, Serial No. 128,942

7 Claims. (Cl. 318—490)

1

This invention relates to an instrument for determining the consistency of materials. It is a modification of the instrument described and claimed in the co-pending application of Charles H. Kimball and William R. Lewis for "Consistency Determination," S. N. 57,066, filed October 28, 1948.

In said prior application it is shown that curves can be obtained which represent the consistency of a material by continuously plotting values taken from the differential in current or power requirements for mixing a material over small increments of time.

An object of this invention is to simplify and improve upon the means for obtaining integrated values proportional to the power requirements in the stirring or mixing of materials. A further object is to produce a sensitive but rugged instrument which does not require the use of vacuum tubes in the fundamental power evaluating circuit.

It is a further object to produce an instrument which will indicate and/or record a rate of change of current in the power requirements during the working cycle of a mixer for determining consistency values.

The instrument is constructed to take advantage of the fact that current variations in the power required to stir or mix a material can be used to show proportional variations in the power. When the consistency of a material changes while being stirred, the mixing blades are intermittently freed from the mix in cycles known as impact cycles having a substantially constant time period. The current required to actuate the mixing blades is a value indicative of the consistency of the material, and the rate of change in current between successive cycles can be employed as a measurement of consistency. This rate of current change, or current slope, can be obtained from the power required to stir the material. In an A. C. power supply to the stirring motor, the power equals the product of the voltage, current and power factor. The voltage is normally constant with reasonable limits, and the variations in the power factor are negligible. Therefore variations in the power are observed from current variations. By means of filter circuits and a recorder, such current variations are proportionally reproduced in the from of a smooth curve which may either represent the change per unit of time in the consistency of a material as it is being stirred, or a static consistency value which may be compared with a previously derived standard.

2

The means by which these and other objects of the invention are obtained are more fully described with reference to the accompanying drawings, in which:

Figure 1 is an electrical diagram of the instrument;

Figure 2 is a graph of the current supplied by the power line;

Figure 3 is a graph of the current after a portion of the cycle has been filtered therefrom;

Figure 4 is a graph of the curve of Figure 3 after the power line frequency has been filtered from the current; and Figure 5 is a graph of the smooth curve produced by differentiating the current into a non-pulsating direct current.

In Figure 1, motor 2, which serves to drive the blades of a mixer or stirrer, is fed by power line 4, having alternating current, a substantially constant voltage, and a negligible power factor. Current transformer 6, shown as a toroid coil on one leg of power line 4, conducts a current proportional to the power line current to rectifier 8, preferably a selenium rectifier, and resistance 10. The alternating current from coil 6 is of the frequency of power line 4, plus a higher or lower frequency component caused by variations in the load on motor 2, such being the current at point A, said current having the graphical form illustrated in Figure 2.

The A. C. power current curve is modulated by the variation in load requirements into cycles $t_1$, $t_2$, $t_3$, etc., which represent the impact cycles as the mixer blades reengaged the material after being momentarily freed therefrom.

Rectifier 8 cuts off a portion of the current curve, so that only positive or negative values of the current are passed through. Thus in Figure 3 only the positive values of the curve of Figure 2, as exist at point B in Figure 1, are illustrated as being passed by rectifier 8, these values having the zero line for a base. Other base positions can be selected as well understood in the art.

By reason of stabilizing resistance 10, a small current is passed to a filter system 11 composed of condenser 12, choke 14 and condenser 16, the power line frequency being filtered out so that at point C, Figure 1, the current takes the graphical form of Figure 4. Thus the current passed to condenser 18 varies proportionately with load current variations in power line 4.

Condenser 18 and resistance 20 in series form a differentiating circuit 21. The current through this circuit develops a voltage across resistor 20 which is proportional to the rate of change of the current impressed on the circuit. It is to be noted that the power frequency of Figure 2 does not appear. The curve of Figure 4 does appear and corresponds to the forward slopes $x$, $y$, and $z$ of each impact cycle which is used to develop a corresponding voltage at point D, Figure 1. The successive voltages at D are represented by the substantially smooth curve D in Figure 5. This voltage changes with changes in the consistency of the mix.

The voltage at point D, Figure 1, is then passed through a rectifier 22 to a measuring network of condenser 24 in parallel with a voltmeter 28 and/or recorder 30. Rectifier 22 prevents condenser 24 from discharging into resistor 20 when the voltage of point D is decreasing. Condenser 24 acts as a part of an integrating circuit with a short-time constant so the voltmeter 28 remains steady during sub-transient conditions. Thus the smooth curve of Figure 5 can be reproduced on the recorder 30.

The described circuit is of simple and rugged construction, and no vacuum tubes are needed to obtain a non-pulsating direct current which is proportional to the power required to drive the mixing or stirring motor.

In substance, this device simply consists of a toroid coil or current transformer, a half-wave rectifier, a filter, a differentiating circuit, and a recording instrument having a blocking rectifier and short-time integration.

Having now described the means by which the objects of the invention are obtained, I claim:

1. A consistency measuring instrument for indicating relative values obtained from the electrical power supplied to a stirring motor, comprising means for producing an alternating current proportional to the current in the power supply to a stirring motor, means receiving said proportional alternating current for eliminating the power supply frequency from said proportional alternating current and permitting a second frequency produced by variations in the load requirements of the motor, and means responsive to said second frequency for differentiating the impulses of said second frequency and producing a non-pulsating direct current proportional to the load variations on the stirring motor.

2. A consistency measuring instrument as in claim 1, further comprising means coupled to said responsive means for integrating the differential values of said second frequency into a direct current.

3. A consistency measuring instrument as in claim 2, said means for producing an alternating current comprising a circuit composed of a current transformer connected in series with a selenium rectifier and a resistor.

4. A consistency measuring instrument as in claim 3, said means for eliminating the power supply frequency comprising a filter circuit composed of a first condenser, a choke coil and a second condenser.

5. A consistency measuring instrument as in claim 4, said differentiating means comprising a condenser and a resistor in series with said power supply frequency eliminating means and connected across said filter circuit.

6. A consistency measuring instrument as in claim 5, said integrating means comprising a circuit having a rectifier, and a condenser in parallel with said resistor of said differentiating means through said rectifier.

7. A consistency measuring apparatus comprising a stirring motor, an alternating electric current source, means connecting said source to said motor, means coupled to said connecting means for producing an alternating current proportional to the current supplied to said motor, means receiving said proportional alternating current for eliminating the power supply frequency from said proportional alternating current and permitting a second frequency produced by variations in the load requirements of said motor, and means responsive to said second frequency for differentiating the impulses of said second frequency and producing a non-pulsating direct current proportional to the load variations on said motor.

WILLIAM R. LEWIS.

References Cited in the file of this patent

UNITED STATES PATENTS

| Number | Name | Date |
| --- | --- | --- |
| Re. 18,855 | Flehr | June 6, 1933 |
| 972,892 | Meyer | Oct. 18, 1910 |
| 1,696,880 | Donle | Dec. 25, 1928 |
| 2,052,413 | Lord | Aug. 25, 1936 |